(12) United States Patent
Pinard et al.

(10) Patent No.: US 6,522,729 B2
(45) Date of Patent: Feb. 18, 2003

(54) TELEPHONE WITH HANDWRITING RECOGNITION

(75) Inventors: Debbie Pinard, Kanata (CA); Douglas Oddy, Greely (CA)

(73) Assignee: Mitel Knowledge Corporation, Kanata (CA)

(*) Notice: Subject to any disclaimer, the term of this patent is extended or adjusted under 35 U.S.C. 154(b) by 64 days.

(21) Appl. No.: 09/793,985

(22) Filed: Feb. 28, 2001

(65) Prior Publication Data

US 2001/0053208 A1 Dec. 20, 2001

(51) Int. Cl.[7] .............................................. H04M 11/00
(52) U.S. Cl. .................................. 379/93.02; 379/93.19
(58) Field of Search .......................... 379/93.19, 93.17, 379/93.23, 93.21, 218.01, 218.02, 223, 355.04, 93.15; 345/179, 180, 181

(56) References Cited

U.S. PATENT DOCUMENTS

| 5,644,628 A | * | 7/1997 | Schwarzer et al. ...... 379/93.19 |
| 5,774,525 A | * | 6/1998 | Kanevsky et al. ............ 379/88 |
| 5,959,260 A | * | 9/1999 | Hoghooghi et al. ...... 178/18.03 |
| 6,201,951 B1 | * | 3/2001 | Duwaer et al. ............. 455/420 |
| 6,252,948 B1 | * | 6/2001 | Okamoto .................. 379/93.23 |
| 6,343,148 B2 | * | 1/2002 | Nagy .......................... 382/187 |
| 6,345,389 B1 | * | 2/2002 | Dureau ....................... 725/116 |

FOREIGN PATENT DOCUMENTS

| JP | 60070855 | | 4/1985 |
| JP | 62098949 A | | 5/1987 |
| JP | 2107040 A | | 4/1990 |
| JP | 6006436 A | | 1/1994 |
| JP | 7336759 A | | 12/1995 |
| JP | 9261358 A | | 10/1997 |
| JP | 11341114 A | | 12/1999 |
| WO | WO/99/57648 A1 | | 11/1999 |

* cited by examiner

*Primary Examiner*—Stella Woo
(74) *Attorney, Agent, or Firm*—Marks & Clerk

(57) ABSTRACT

A system and method for accessing a party with a telephone over a LAN with user verification and dialing achieved by making use of handwriting analysis. A server incorporating phone agents and user agents is linked to software for analyzing the handwriting from a touch sensitive pad. The system and method prevents unauthorized access to a dialed party and ensures user validity.

13 Claims, 3 Drawing Sheets

TELEPHONE WITH HANDWRITING RECOGNITION

FIELD OF THE INVENTION

The present invention relates to a telephone with a handwriting recognition function and more particularly, the present invention relates to telephone having user handwriting recognition which simultaneously identifies a user of the device.

BACKGROUND OF THE INVENTION

In the prior art, access to another party by phone was typically achieved by employing the keys of the telephone. The surname of the party to whom connection was desired was entered with the appropriate keys and the string converted to a number which was subsequently dialed. Although useful, this procedure is not entirely efficient when many users connected to the same telephone network have a similar or identical surname.

One of the primary limitations is realized when a user wishes to obtain his or her saved messages. Usually, access involves entry of a password on the telephone keypad. This is the only level of security between the stored messages and the user who has the password. As is evident, use of such passwords is not an adequate security measure, since such passwords may be observed by unauthorized users and thus access granted to private messages.

A system and method would be desirable where unauthorized access to private messages and the absence of keypad entry of names and passwords were eliminated. The present invention addresses these necessities and provides for a higher level of security.

SUMMARY OF THE INVENTION

In accordance with one object of one embodiment of the present invention, there is provided a method of effecting communication between a first phone and a second phone linked on a communications medium and connected to a public switched network, comprising:

providing the first phone and the second phone, at least one having a handwriting receiving area connected thereto;

providing a server connected between the communications medium and the public switched network, the server including handwriting decoding software, a phone agent in communication with the first phone and the second phone and a user agent in communication with the phone agent;

forwarding entered name data from the phone agent to the handwriting software;

decoding name entered and forwarding information to the phone agent;

forwarding the information from the phone agent to the user agent; and effecting a call based on the information from the user agent.

In accordance with a further object of one embodiment of the present invention, there is provided a system for communicating with a first phone and a second phone by handwriting translation, comprising:

a handwriting area connected to at least one of the first phone and the second phone;

a communications medium;

a public switched network connected to a server;

a telephony server connected to the communications medium, the server including: handwriting software for translating handwriting and returning translated information;

a phone agent for forwarding a name written to the handwriting software and receiving the translated information;

a user agent having stored data in communication with the phone agent to effect access to the stored data related to the translated information and dial a number based on accessed data.

The handwriting receiving area may comprise any of the known touchpad devices currently available and may be directly integrated with the telephone base or handset. Where this is not convenient, the device may be connected to the telephone as an auxiliary component.

Advantageously, the device prevents unauthorized users from accessing the system, since handwriting is matched to the user. This feature prevents privacy breach and further avoids the use of the keypad for making a call. As a concomitant convenience, log in procedures eliminate the use of passwords entered on the keypad; access is granted based on database verification of the handwriting of the user.

Having thus generally described the invention, reference will now be made to the accompanying drawings, illustrating preferred embodiments and, in which:

BRIEF DESCRIPTION OF THE DRAWINGS

Similar numerals employed in the text denote similar elements.

DETAILED DESCRIPTION OF THE PREFERRED EMBODIMENTS

Figure 1:
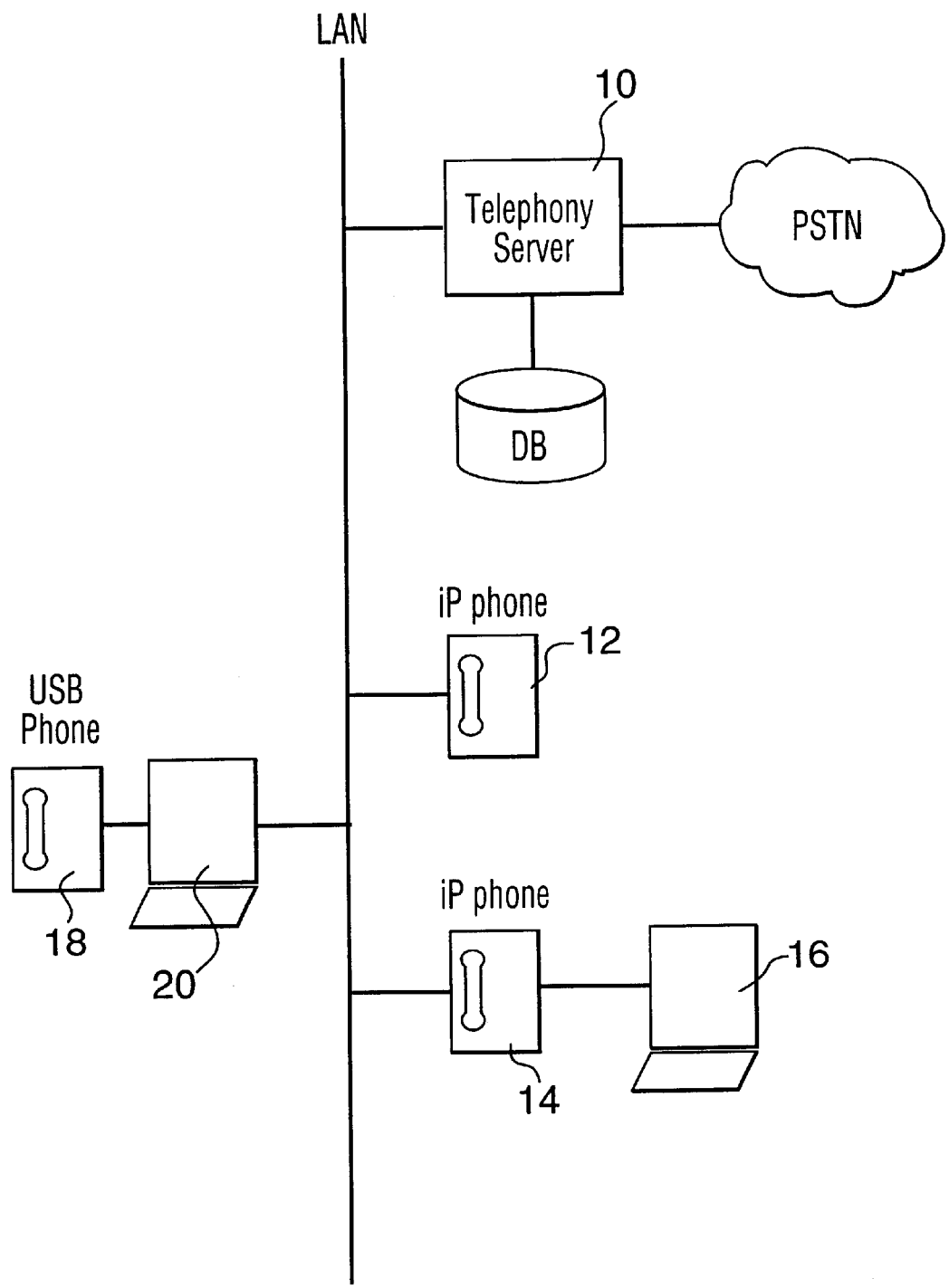
FIG. 1 is a block diagram of the prior art system configuration.

With reference to FIG. 1 initially, shown is a configuration where a telephony server 10 is connected to a LAN with IP phone sets 12 and 14 connected to the LAN and computer 16. Also illustrated is a USB phone set 18 connected to a computer 20 in turn connected to the LAN. This is a typical arrangement which is well identified in the art.

Other suitable communications media may be readily employed such as 10 or 1,000 Mbps wired LANs, RF communications such as wireless LAN or Bluetooth RF, IR communications, ISDN connections, non-standard based digital transmission means, serial digital interfaces, etc. For purposes of an example, a LAN will be referenced.

Figure 2:
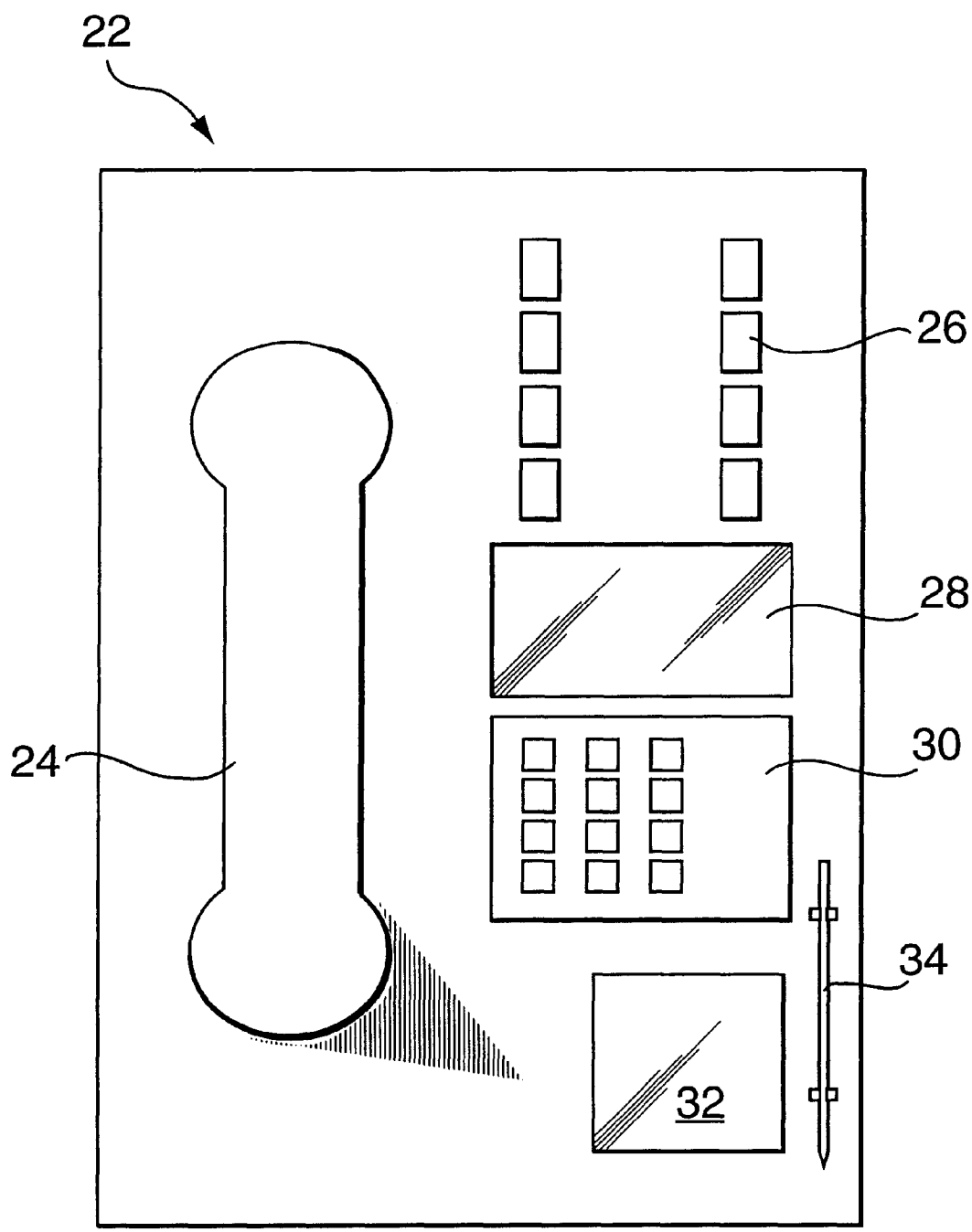
FIG. 2 is a plan view of one embodiment of the telephone for use in the present invention.

FIG. 2 illustrates an embodiment of the phone set, globally denoted by numeral 22, in accordance with the present invention. The set 22 includes the usual elements- handset 24, line indicators 26, display 28 and keypad 30. The handwriting receiving area 32 is illustrated as integrated with the set 22 and includes a stylus 34.

The handwriting area 32 comprises a semiconductive touchpad incorporating technology known in the art. As an example, the VersaPad™ manufactured by the Interlink Electronics Company, may be used. Other suitable examples will be appreciated by those skilled in this art.

Figure 3:
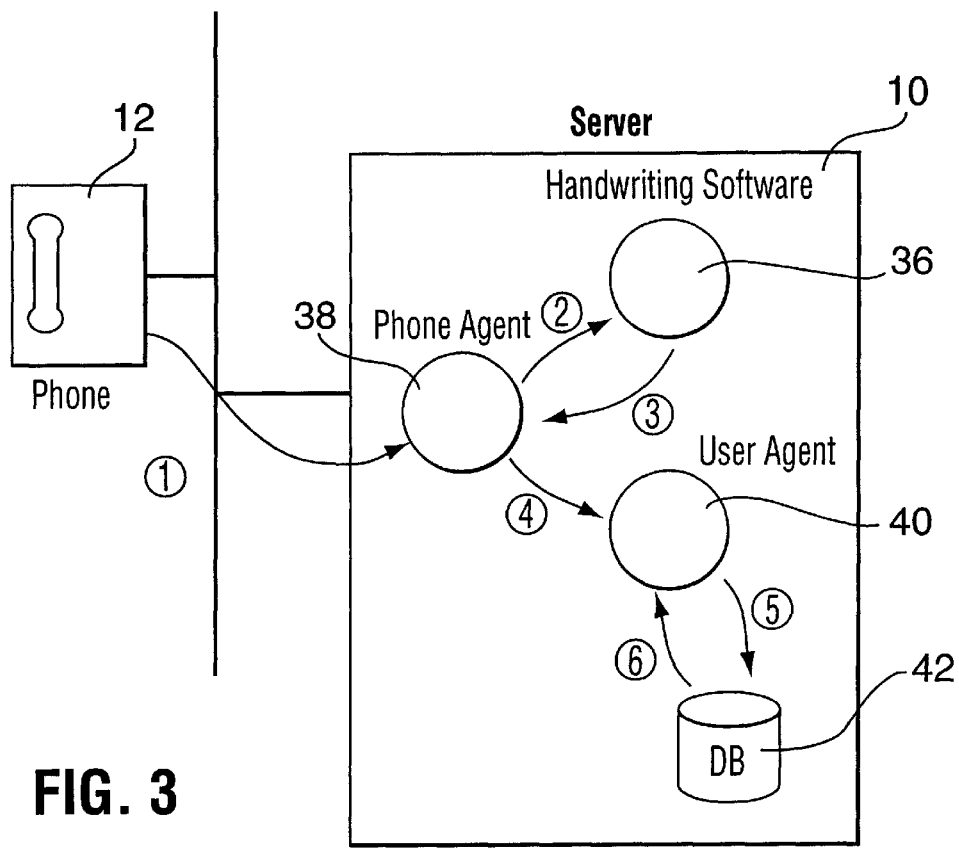
FIG. 3 is a block diagram illustrating the operation according to one embodiment of the invention.

Turning now to FIG. 3, a block diagram is illustrated in one possible configuration of the invention. In the server 10, there is provided handwriting software 36 for digitizing hand written information and a phone agent 38 in communication with the LAN and telephone set 12. Telephone set 12 is indicated, however it will be appreciated that any one or all of the sets 12,14 or 18 may also be used.

Server 10 also includes a user agent 40 accessible to a database or memory device 42 for providing information exchange between device 42 and user agent 40. Dialing protocol is achieved by interaction of the elements as follows. A user writes the name or other identifying information on area 32 of the set 22 which information is forwarded to phone agent 38. The agent 38 provides the information to the handwriting software 36 for decoding in a known format and the decoded information is returned to phone agent 38. In this example, the returned information is the name of the person to whom the call is directed. This information is conveyed to user agent 40, which accesses database 42 in order to determine the telephone number of the person identified. Once completed, the number identified is dialed in the conventional manner.

Figure 4:
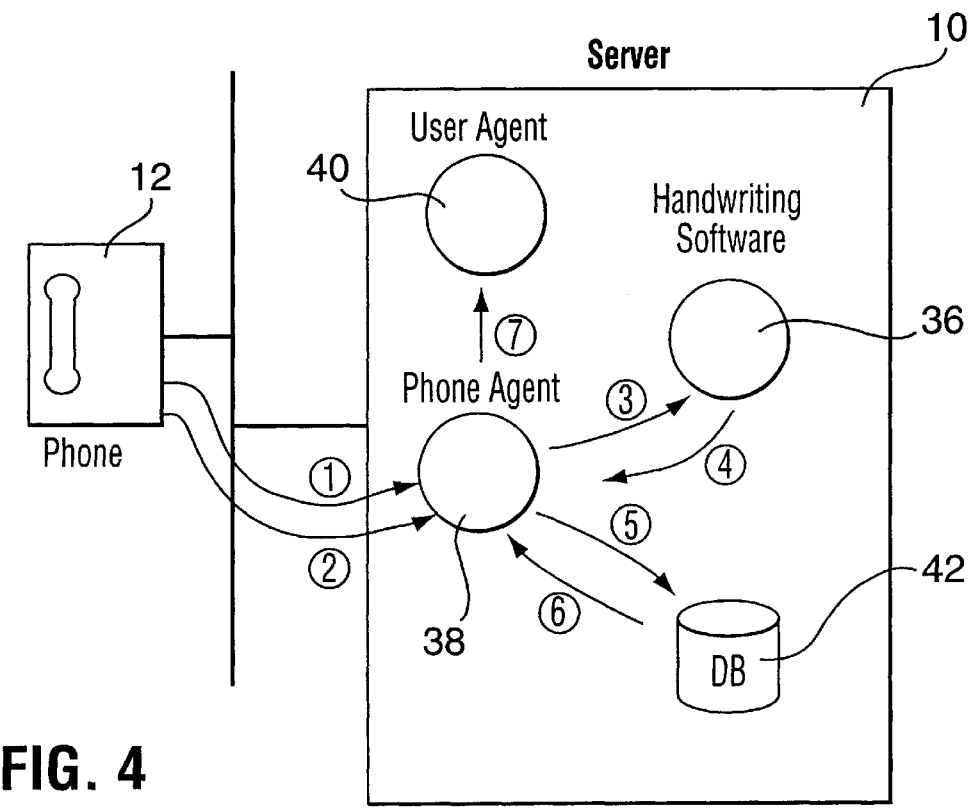
FIG. 4 is a block diagram illustrating the operation of the log in procedure according to one embodiment of the invention.

The protocol for logging in to access the system is illustrated in the block diagram of FIG. 4. Procedurally, a user would indicate that log in is desired with this information being forwarded to phone agent 38. The user would then write his or her name on the handwriting pad 32 and the information is verified by the software 36. Verification is confirmed by the identification of the user from the database 42 and access to the user agent 40 is then established.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of permitting a user to access a telephone system including a communications medium, comprising the steps of:
   providing a phone connected to said communications medium, said phone having a handwriting touchpad associated therewith for permitting user entry of handwritten data;
   providing a telephony server connected between said communications medium and a public switched network, said telephony server including handwriting decoding software, a phone agent in communication with said phone, mid a user agent in communication with said phone agent, said user agent accessing a database to extract user data;
   sending information to said phone agent flat a login is desired;
   said user handwriting his or her name on said handwriting tablet subsequent to a login request;
   forwarding entered handwriting data from said phone agent to said handwriting software;
   decoding the entered name from said entered handwriting data to identity the user and forwarding identity information to said phone agent;
   verifying the identity of the identified user with said handwriting software by matching said handwriting to known handwriting of the identified user; and
   granting access to said user agent when said handwriting matches the known handwriting of the identified user.

2. The method as set forth in claim 1 further including verifying a user by the steps of:
   sending handwriting information from a user to said phone agent in said server;
   decoding said information with said handwriting software;
   comparing decoded information with stored information to confirm identity of said user; and
   connecting said phone agent and said user agent.

3. The method as set forth in claim 2, wherein said user agent is connected to a data storage device.

4. The method as set forth in claim 3, wherein said phone agent communicates with a plurality of user agents.

5. The method as set forth in claim 2, wherein upon verification of an identified user, user information is forwarded to the verified user.

6. The method as set forth in claim 1, wherein after access has been granted to said user agent, it further comprises the steps of:
   handwriting the name of a party to be called on said touchpad, decoding the name of said party by said handwriting software;
   forwarding said decoded information to the phone agent;
   forwarding said decoded information to said user agent to retrieve the telephone number of said party from a database; and
   completing a call to said party by dialing the number retrieved from said database.

7. A telephone system, comprising:
   a phone connected to a communications medium;
   a handwriting touchpad associated with said phone;
   a telephony server connected to said communications medium, said telephony server including handwriting software for decoding handwriting data to identify a user and verifying the identity of said identified user from said handwriting data by matching said handwriting data with known handwriting of the identified use;
   a phone agent for forwarding entered handwriting data to said handwriting software and receiving said decoded information; and a user agent in communication with said phone agent for accessing a database to extract user data; and
   whereby said phone agent grants access to said user agent based on user verification by said handwriting software.

8. The system as set forth in claim 7, wherein said handwriting touchpad is integral with said phone.

9. The system as set forth in claim 7, wherein said system includes a plurality of user agents connected to a respective phone agent.

10. The system as set forth in claim 7, wherein said system includes a plurality of interconnected phone agents.

11. The system as set forth in claim 7, wherein said system includes a plurality of phones connected to said communications medium.

12. The system as set forth in claim 7, wherein said communications medium comprises a LAN.

13. The system as set forth in claim 7, wherein said communications medium comprises at least one of:
   RF communications;
   IR communications,
   ISDN connections;

non-standard based digital transmission means;

serial digital interfaces; or a combination thereof.

* * * * *